C. H. BROWN.
VEHICLE BRAKE.
APPLICATION FILED APR. 18, 1913.

1,116,235.

Patented Nov. 3, 1914.

WITNESSES:

INVENTOR
Charles H. Brown
BY G. H. Strong
ATTORNEY

UNITED STATES PATENT OFFICE.

CHARLES H. BROWN, OF RICHMOND, CALIFORNIA.

VEHICLE-BRAKE.

1,116,235.  Specification of Letters Patent.  Patented Nov. 3, 1914.

Application filed April 18, 1913. Serial No. 761,874.

*To all whom it may concern:*

Be it known that I, CHARLES H. BROWN, a citizen of the United States, residing at Richmond, in the county of Contra Costa and State of California, have invented new and useful Improvements in Vehicle-Brakes, of which the following is a specification.

This invention relates to a vehicle brake.

It is the object of this invention to provide a brake which is particularly adapted for use on automobiles and other road vehicles, and which is so constructed as to operate directly on the road-bed to retard the movements of the vehicle to which it is attached.

A further object is to provide a brake which can be operated to prevent skidding of the vehicle, and which may be employed in locking the vehicle against movements when the latter is not in use.

Another object is to provide a brake which is simple in construction, efficient in operation, and adapted to be readily applied to most vehicles at a nominal expense.

The invention comprises a brake-shoe supported on an arm pivoted to and depending from the vehicle frame, a linked support for the lower end of the arm, and means operating on said link support for throwing the brake-shoe in and out of contact with the ground.

The invention further consists of the parts and the construction and combination of parts as hereinafter more fully described and claimed, having reference to the accompanying drawings, in which—

Figure 1:
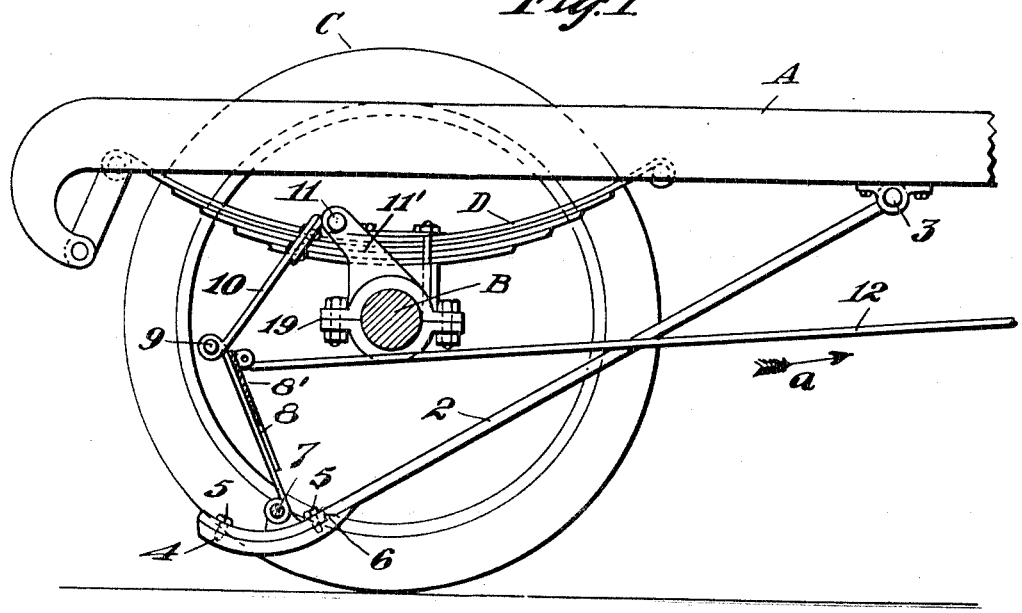
Figure 2:
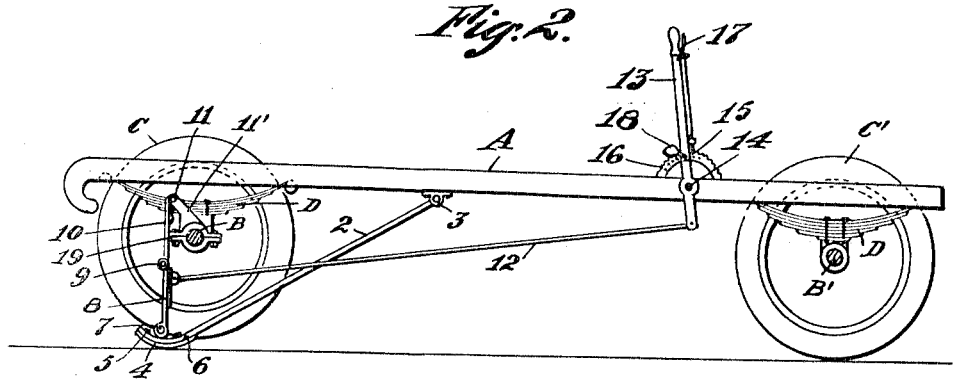
Figure 3:
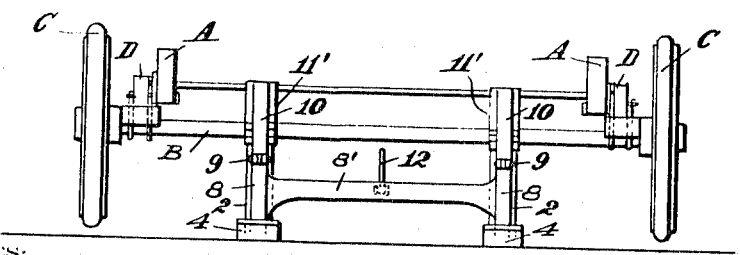

Figure 1 is a view in vertical section and elevation of the rear portion of a vehicle running-gear, showing the invention as applied with the brake in its inoperative position. Fig. 2 is a view in section and elevation showing the brake in its operative position. Fig. 3 is a rear end view of same.

In the drawings A represents the vehicle frame, B and B' indicate the rear and front axles with wheels C and C' thereon; the frame A being here shown as connected to the axles B and B' by means of springs D.

The essence of this invention resides in a pair of spaced arms 2, pivoted at 3 to the frame A and depending downward therefrom at an incline; the arms 2 extending rearwardly and terminating beneath the rear axle B. Detachably mounted on the under side of the outer ends of the arms 2 are shoes 4, which are secured to the arms 2 by means of bolts 5; transverse ribs 6 on the shoes 4 engaging corresponding grooves on the arms 2 to relieve the bolts 5 of shearing strain. Pivotally connected to the arms 2 adjacent the shoes 4, as indicated at 7, are links 8, which extend upwardly and are pivoted at 9 to the lower ends of links 10, which in turn have their upper ends pivoted at 11 to standards 11' rigidly mounted on the axle B. A distance bar 8' connects the links 8, and attached to the bar 8' is a connecting rod 12, the outer end of which is pivotally secured to a lever 13, mounted on the frame A, which lever may be operated manually or in any other suitable manner to reciprocate the connecting rod 12.

The hand-lever 13 is here shown as comprising the ordinary hand-lever, pivoted at 14, and having a dog 15, which normally engages with a toothed sector 16 to hold the lever 13 and its connections against movement. A grip-lever 17 connects with the dog 15, by the operation of which the latter may be released when it is desired to rock the lever 17. The parts are normally positioned with the shoes 4 out of contact with the road surface, as shown in Fig. 1.

In the operation of the invention when it is desired to throw the brake-shoes 4 into contact with the road surface, to retard the movements of the vehicle, the connecting rod 12 is moved longitudinally in the direction of the arrow $a$ in Fig. 1, by means of the hand-lever 13, or in any other suitable manner. This movement of the connecting rod 12 tends to straighten the links 8 and 10, which serve to move the arm 2 in a downward direction, and causes the shoes 4 to contact the road surface. The links 8 and 10 are of such length that when they assume their straightened or vertical position, as shown in Fig. 2, the rear wheels C will be lifted clear of the ground, so as to throw the weight of the rear portion of the vehicle upon the shoes 4. The rear portion of the vehicle will then drag upon the shoes 4 in such manner as to overcome the momentum of the vehicle and bring it to a stop. This feature of elevating the rear wheels C to clear the ground is important in power-propelled vehicles, wherein the power is applied to the rear wheels, as it enables the braking of the vehicle without shutting off the power. This construction is also advantageous where it is desired to lock the vehicle against movement to prevent its being used by unauthorized persons. This is accomplished by moving the links 8 and 10 to their vertical position, as shown in Fig. 2, so as to dispose the rear wheels C clear of the ground, then locking the links in this position against movement. This may be done in any suitable manner; a padlock 18 being here shown as employed for this purpose, the hasp of which engages the lever 13 and the sector 16 in such manner as to prevent the operation of the former, and consequently prevents the operation of the links 8 and 10.

The movement of the links 8 and 10 in a forward direction is limited by any suitable stop, here shown as projecting flanges 19 on the rear axle B, against which the link 10 abuts when the latter is in its innermost position. If desired, the inner movement of the links 8 and 10 may be such that the pivotal connection 9 will move a short distance beyond the vertical, and out of alinement with the pivotal points 7 and 11, thereby effectively locking the links against easy retraction.

From the foregoing it will be seen that the brake-shoes 4 may be readily thrown in and out of contact with the ground by the reciprocation of the connecting rod 12.

It is obvious that while I have shown a pair of brake-shoes as employed, this number may be increased or diminished, if desired. It is also obvious that any means may be employed for operating the connecting rod 12, whereby the brake-shoes 4 may be thrown in or out of contact with the ground. By making the brake-shoes detachable they may be readily replaced when worn.

An important feature of this invention is that skidding of the vehicle to which it is attached may be readily prevented, and which by reason of operating directly on the road surface will result in a saving of tires.

Having thus described my invention, what I claim and desire to secure by Letters Patent is:

In combination with the frame and rear axle of a vehicle, standards secured to the axle and projecting upwardly and rearwardly therefrom, upper links pivoted to the upper ends of the standards and depending therefrom, said links normally extending in spaced inclined relation to the rear axle and being adapted when in braking position to have their central portions engage the axle to thereby have their forward movement restricted thereby, lower links pivoted to the upper links and depending therefrom and having their lower ends inclined forwardly, arms pivoted to the frame and to the lower links, shoes on the lower ends of the rods, and means to actuate the lower links to thereby cause the upper links to engage the axle.

In testimony whereof I have hereunto set my hand in the presence of two subscribing witnesses.

CHARLES H. BROWN.

Witnesses:
W. W. HEALEY,
G. M. PAGE.